H. C. SHOEMAKER.
LOCK FAUCET.
APPLICATION FILED MAR. 18, 1915.
1,209,768.
Patented Dec. 26, 1916.
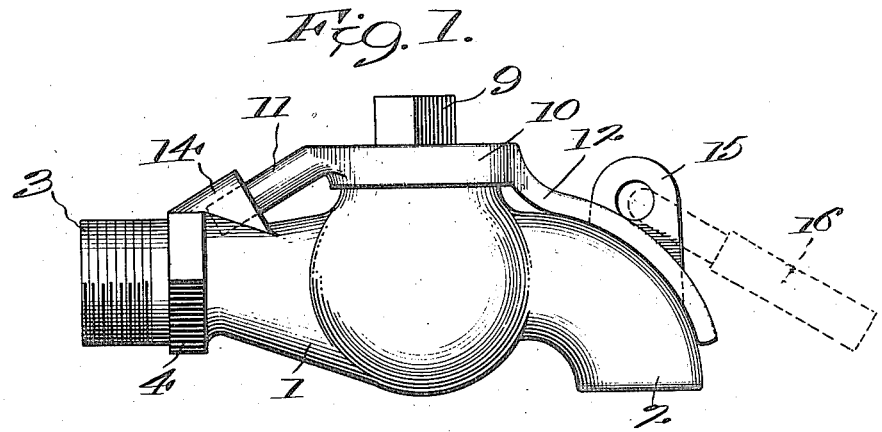
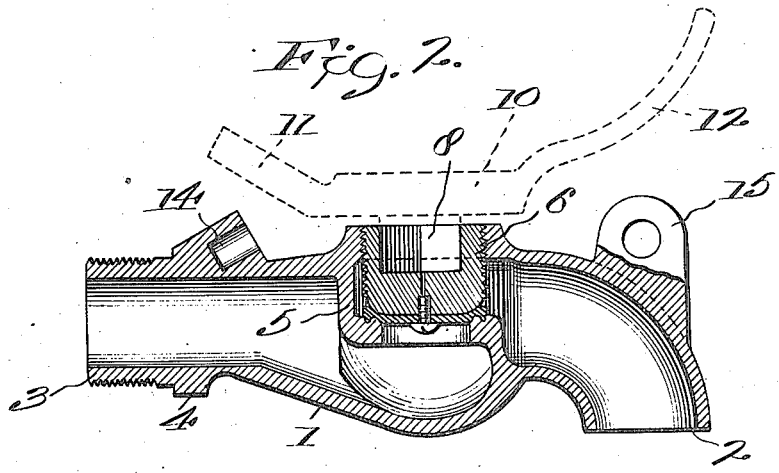
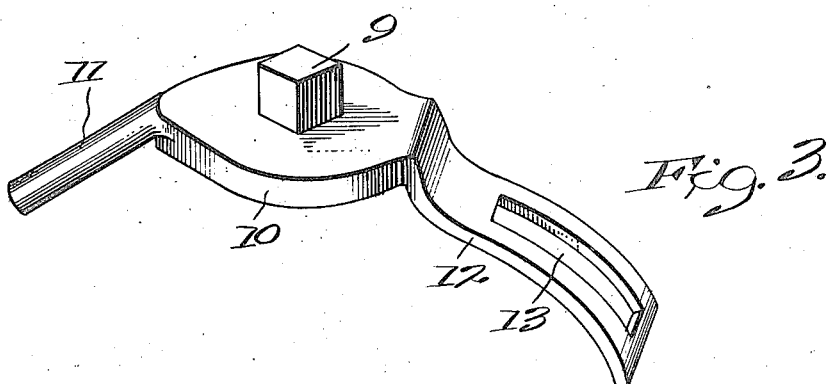
Witnesses
Edwin J. Beller.
R. J. Mawhinney.
Inventor
Harry C. Shoemaker,
By
Wilkinson, Guista & MacKaye
Attorneys.

UNITED STATES PATENT OFFICE.

HARRY C. SHOEMAKER, OF FREEPORT, ILLINOIS, ASSIGNOR TO THE CHAMBERS, BERING, QUINLAN CO., OF DECATUR, ILLINOIS, A CORPORATION OF ILLINOIS.

LOCK-FAUCET.

1,209,768.

Specification of Letters Patent. Patented Dec. 26, 1916.

Application filed March 18, 1915. Serial No. 15,370.

*To all whom it may concern:*

Be it known that I, HARRY C. SHOEMAKER, a citizen of the United States, residing at Freeport, in the county of Stephenson and State of Illinois, have invented certain new and useful Improvements in Lock-Faucets; and I do hereby declare the following to be a full, clear, and exact description of the invention, such as will enable others skilled in the art to which it appertains to make and use the same.

The present invention relates to improvements in lock faucets, and has for an object to provide an improved faucet and associated device for locking the valve of the faucet so as to prevent unauthorized persons from tampering with the same.

Another object of the present invention resides in providing an improved lock faucet wherein the locking device will constitute a key for operating the valve when the same is released.

It is a further object of the present invention to provide an improved lock faucet the parts whereof will be simple, economical of manufacture, and readily operable.

With these and other objects in view the invention consists in the novel details of construction and combinations of parts more fully hereinafter disclosed and particularly pointed out in the claim.

In the accompanying drawings forming a part of this application, and in which similar reference symbols indicate corresponding parts in the several views, Figure 1 is a side elevational view of a faucet constructed in accordance with the present invention and illustrated in locked position. Fig. 2 is a longitudinal sectional view of the same illustrating the locking device in dotted lines employed as a key; and Fig. 3 is a perspective view of the locking device.

Referring more particularly to the drawings, wherein one embodiment of the invention is illustrated, 1 designates the shell or casing of the improved faucet, constructed with a delivery spout 2 and a threaded end 3 for connection to the service pipe. Adjacent the threaded end 3, the casing 1 is formed with the hexagonal or other enlargement 4, for receiving a suitable tool whereby the faucet may be readily connected and disengaged.

Intermediate the threaded end 3 and delivery spout 2, the casing 1 of the faucet is advantageously formed substantially globular and provided with an internal diaphragm 5, affording a valve seat, as will be understood from an inspection of Fig. 2.

Coöperating with the valve seat in the diaphragm 5 is any conventional or approved valve 6, preferably the plug valve illustrated to advantage in Fig. 2, the same being threaded through an opening in the top of the faucet casing 1 and provided with a recess 8 of square or other suitable configuration. The recess 8 in the valve 6 is arranged to receive a correspondingly shaped lug 9, cast or secured to the head 10 of a key or locking device, more particularly illustrated in Fig. 3 to be provided with an angularly projecting stem 11, and a handle 12 projecting from the head 10 substantially opposite the stem 11 and slotted as indicated at 13.

The stem or projection 11 on the key is arranged to occupy a socket 14 formed in the casing 1 of the faucet to one side of the valve 6; while the slot 13 in the handle 12 is arranged to be received over a perforated lug 15 formed upstanding from the spout 2. The perforated lug 15 is adapted to receive a padlock, or other suitable device, as indicated at 16 in Fig. 1.

Fig. 1 discloses the normal arrangement of parts, where the key is secured against unauthorized removal by the padlock 16, and where the head 10 of the key covers the socket 8 of the valve 6 so as to positively prevent tampering therewith. When authorized delivery of liquid is desired, the padlock 16 is released and the key removed by raising the handle 12 to disengage the lug 15 and withdrawing the stem 11 from engagement with the socket 14. The key is thereupon reversed, as indicated in dotted lines in Fig. 2, and the lug 9 inserted in the recess 8 of the valve. By operation of the key in this position, the valve 6 may be rotated to open, close, or "set" the same, and the valve secured in position by inverting the key and positioning and locking the same, as shown in Fig. 1.

It is obvious that those skilled in the art may vary the details of construction and arrangements of parts without departing from the spirit of my invention, and therefore I do not wish to be limited to such features except as may be required by the claim.

I claim:

A lock faucet comprising a casing, a valve located in said casing and having a recess exposed therethrough, a socket on said casing to one side of said valve, an ear on said casing arranged at the opposite side of said valve and adapted to receive a lock, a key detachable from said faucet casing and comprising a head for covering the socket in said valve, a projection for occupying said socket, a slotted handle arranged to engage said ear, and a lug on said head adapted to fit the recess in said valve for operating the same, substantially as described.

In testimony whereof I affix my signature in presence of two witnesses.

HARRY C. SHOEMAKER.

Witnesses:
M. W. GRAHAM,
S. H. WEBSTER.